(12) United States Patent
Barthelmess

(10) Patent No.: US 10,196,558 B2
(45) Date of Patent: Feb. 5, 2019

(54) PARTICLE COATING PROCESS AND COMPOSITIONS FOR CERAMIC PROPPANT EXTRUSION

(71) Applicant: Schlumberger Technology Corporation, Sugar Land, TX (US)

(72) Inventor: Thomas Philip Barthelmess, Barcelona (ES)

(73) Assignee: Schlumberger Technology Corporation, Sugar Land, TX (US)

( * ) Notice: Subject to any disclaimer, the term of this patent is extended or adjusted under 35 U.S.C. 154(b) by 91 days.

(21) Appl. No.: 14/975,526

(22) Filed: Dec. 18, 2015

(65) Prior Publication Data

US 2016/0102245 A1 Apr. 14, 2016

Related U.S. Application Data

(63) Continuation-in-part of application No. PCT/US2014/065587, filed on Nov. 14, 2014.
(Continued)

(51) Int. Cl.
*E21B 43/267* (2006.01)
*C09K 8/80* (2006.01)
(Continued)

(52) U.S. Cl.
CPC .............. *C09K 8/80* (2013.01); *B01J 13/00* (2013.01); *B01J 19/06* (2013.01); *B28B 3/26* (2013.01);
(Continued)

(58) Field of Classification Search
CPC ....... C09K 8/80; C09K 3/1409; C09K 3/1436; C09K 8/805; E21B 43/267; E21B 43/26
See application file for complete search history.

(56) References Cited

U.S. PATENT DOCUMENTS 8,490,698 B2   7/2013 Panga et al.
8,728,991 B2   5/2014 Wu et al.
(Continued)

FOREIGN PATENT DOCUMENTS

WO   2006010036 A2   1/2006
WO   2012177625 A1   12/2012
WO   2015077130 A1   5/2015

OTHER PUBLICATIONS

International Search Report and Written Opinion issued in PCT/US2014/065587 dated Feb. 24, 2015; 13 pages.
(Continued)

*Primary Examiner* — Zakiya W Bates
(74) *Attorney, Agent, or Firm* — Andrea E. Tran

(57) ABSTRACT

Methods include providing an aqueous slurry of ceramic forming raw materials, where at least a portion of the ceramic forming raw materials are enhanced particulates, and flowing the slurry through at least one extrusion die face to form slurry bodies while the slurry is under a hypotensive condition which is less than about 30 kPa, or otherwise pressure lower than conventional extrusion pressures using unenhanced raw materials. The slurry bodies may then be received in a collecting hopper, and thereafter sintering to form particles, such as ceramic proppant particles. Enhanced particulates may be raw material particulates that are coated, selectively shaped, of particular size(s), or any combination thereof.

27 Claims, 2 Drawing Sheets

Related U.S. Application Data

(60) Provisional application No. 61/905,943, filed on Nov. 19, 2013.

(51) Int. Cl.

| | | |
|---|---|---|
| *C04B 35/622* | (2006.01) | |
| *C04B 35/632* | (2006.01) | |
| *B28B 3/26* | (2006.01) | |
| *C04B 35/628* | (2006.01) | |
| *C04B 35/64* | (2006.01) | |
| *B01J 13/00* | (2006.01) | |
| *B01J 19/06* | (2006.01) | |
| *C04B 35/626* | (2006.01) | |
| *E21B 43/26* | (2006.01) | |

(52) U.S. Cl.
CPC .......... *C04B 35/622* (2013.01); *C04B 35/626* (2013.01); *C04B 35/628* (2013.01); *C04B 35/632* (2013.01); *C04B 35/64* (2013.01); *C09K 8/805* (2013.01); *E21B 43/26* (2013.01); *E21B 43/267* (2013.01); *B01J 2219/2423* (2013.01); *C04B 2235/528* (2013.01); *C04B 2235/5427* (2013.01); *C04B 2235/5436* (2013.01); *C04B 2235/5445* (2013.01); *C04B 2235/5481* (2013.01); *C04B 2235/6023* (2013.01); *C04B 2235/612* (2013.01); *C04B 2235/94* (2013.01)

(56) References Cited

U.S. PATENT DOCUMENTS

| | | |
|---|---|---|
| 2007/0144736 A1 | 6/2007 | Shinback et al. |
| 2008/0241540 A1 | 10/2008 | Canova et al. |
| 2009/0044945 A1 | 2/2009 | Willberg et al. |
| 2010/0326657 A1 | 12/2010 | Hellmann et al. |
| 2012/0190597 A1* | 7/2012 | Chatterjee ................ B28B 3/14 507/269 |
| 2012/0227968 A1 | 9/2012 | Eldred et al. |
| 2012/0231981 A1 | 9/2012 | Eldred et al. |
| 2013/0025862 A1 | 1/2013 | Eldred et al. |
| 2014/0131045 A1 | 5/2014 | Loiseau et al. |
| 2015/0060064 A1 | 3/2015 | Lafferty et al. |

OTHER PUBLICATIONS

International Search Report and Written Opinion issued in PCT/US2016/065219 dated Mar. 20, 2017; 12 pages.

Office Action issued in Chinese Patent Application No. 201480063336.0 dated Dec. 5, 2017; 15 pages (with English Translation).

Office Action issued in Chinese Patent Application No. 201480063336.0 dated Jul. 25, 2018; 12 pages (with English translation).

* cited by examiner

PARTICLE COATING PROCESS AND COMPOSITIONS FOR CERAMIC PROPPANT EXTRUSION

RELATED APPLICATION INFORMATION

This Patent Document is a continuation-in-part claiming priority under 35 U.S.C. § 120 and 35 U.S.C. § 363 to PCT App. Ser. No. PCT/US14/65587 titled Ceramic Particles Formed From Perforated Membranes, filed on Nov. 14, 2014 and having a priority date of Nov. 19, 2013, which is incorporated herein by reference in its entirety, and also in turn claiming priority to U.S. Provisional Application No. 61/905,943 filed Nov. 19, 2013, which is incorporated herein in its entirety.

FIELD

The field to which the disclosure generally relates to is proppant particles formed by extruding a slurry to produce divided particles from slurry bodies and thereafter sintering the slurry bodies to formed ceramic particles, along with methods of use of the ceramic particles, as well as compositions of slurries for forming the ceramic particles.

BACKGROUND

This section provides background information to facilitate a better understanding of the various aspects of the disclosure. It should be understood that the statements in this section of this document are to be read in this light, and not as admissions of prior art.

Hydraulic fracturing is a process of pumping liquids down a well and into a subterranean formation at high rate and pressure, such that a fracture is formed in the rock around the well. After pumping a liquid volume sufficient to widen the fracture adequately, solid particles, called "proppant," are added to the liquid and placed in the fracture to prevent the rock fractures from closing and allowing the oil and/or gas flowing through the fractures into a wellbore for production of the hydrocarbons. The production rate and production service of fluid from the well is usually significantly increased after the fracturing treatment. Vast improvements in the hydraulic fracturing process have been developed since the process was originally patented in 1949.

The material first used for proppant in hydraulic fracturing of wells was silica sand. As wells became deeper, sand was sometimes found to have inadequate strength or other properties. For example, in deep wells, stress of the earth would cause the sand to crush and become much less effective in increasing the production rate of a well. In turn, synthetic proppant materials were developed to provide higher strength proppants. One type of synthetic proppant was sintered bauxite. In later years, a variety of ceramic raw materials have been used to make sintered ceramic proppants, including bauxite containing alumina and clay minerals, such as kaolin.

Ceramic proppant is produced by a variety of techniques, one of them being extrusion. Due to the use of various minerals, the rheology of the ceramic slurry, which passes through the extruder, may create, and require, very high pressure. Such high pressure increases the potential for equipment abrasion, reduces potential extrusion process output, and may lead to increased power consumption, as well as the requirement for heavy and expensive mechanical construction of all parts of the extruder.

Thus, there remains a continuing need to develop compositions and techniques used in the preparation of synthetic proppants in order to reduce high-pressure requirements during the extrusion process, such need met at least in part by the following disclosure.

SUMMARY

This section provides a general summary of the disclosure, and is not a necessarily a comprehensive disclosure of its full scope or all of its features.

In a first aspect of the disclosure, methods include providing an aqueous slurry of ceramic forming raw materials, where at least a portion of the ceramic forming raw materials are enhanced particulates, and flowing the slurry through at least one extrusion die face to form slurry bodies while the slurry is under a hypotensive condition, or otherwise pressure lower than conventional extrusion pressures using unenhanced raw materials. The slurry bodies may then be received in a collecting hopper, and thereafter sintering to form particles, such as ceramic proppant particles. Enhanced particulates may be raw material particulates which are coated, selectively shaped, of particular size(s), or any combination thereof.

In another aspect of the disclosure, methods involve providing an aqueous slurry of ceramic forming raw materials including a reactant and a dispersant, where at least a portion of the ceramic forming raw materials are coated particulates, then flowing the slurry through a perforated membrane while the slurry is under a hypotensive condition and while energizing the slurry to form slurry bodies. The slurry bodies may then pass through a mist in a chamber, the mist including a coagulation agent to react with the reactant in the slurry bodies. Slurry bodies are then received in a collecting hopper, and thereafter sintered form ceramic proppant particles.

Yet other aspects provide methods of hydraulic fracturing a subterranean formation penetrated by a wellbore by pumping a fracturing fluid into the wellbore at a pressure above the fracturing stress of the formation and adding proppant particles to the fracturing fluid then delivering the proppant particles and the fluid into the wellbore. The proppant particles may be prepared by providing an aqueous slurry of ceramic forming raw materials in which at a least a portion of which are coated or otherwise enhanced, flowing the slurry through a die face to form slurry bodies under a hypotensive condition, receiving the slurry bodies in a collecting hopper, and drying the slurry bodies to form the proppant particles.

Some aqueous slurries used in accordance with the disclosure include raw materials which are enhanced particulates which have one or a combination of enhancements including a coating, a plurality of volume-average particle size distribution modes, and any suitable shape such as substantially spherical, needle shaped, flat, ribbon like, grooved, ovate, trilobal shape, star shaped, flat shaped, rectangular shaped, cubic, bar shaped, flaked, cylindrical shaped, filaments, threads, and the like, or any combinations thereof. The aqueous slurry may include bauxite containing less than eighty percent alumina. The aqueous slurry may also contain a rheology modifying agent, a reactant and a dispersant. In some cases, the dispersant is a surfactant, which may at least partially influence slurry body shape, size, or combination thereof. The aqueous slurry may in some aspects, have a solids content of from about 60% by weight to about 88% by weight.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
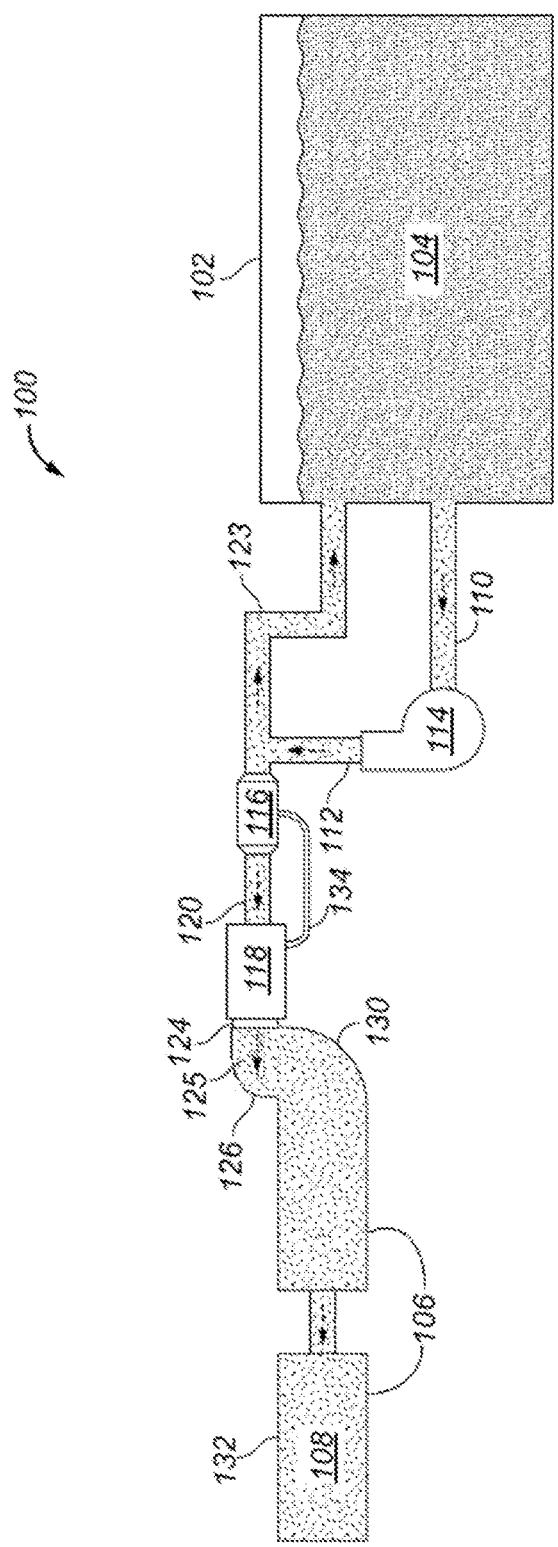
FIG. 1 illustrates a system used in some method embodiments for preparing proppant from a ceramic slurry including particulate raw materials which are enhanced, in accordance with an aspect of the disclosure; and, FIG. 2 depicts another system used in some method embodiments for preparing proppant from a ceramic slurry including particulate raw materials which are enhanced, according to an aspect of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The inventors have discovered processes and compositions which provide ceramic proppant of targeted shape and size distribution which is produced in a low pressure hypotensive process, or otherwise a process which does not require pressures which may lead to equipment abrasion, reduced process output, high power consumption, as well as the requirement for heavy and expensive mechanical construction of some or all parts of the equipment. In some embodiments, the processes and compositions used according to the disclosure provide lowered pressure, hypotensive production of ceramic slurry bodies from an extruder, as compared with the high pressure requirements of conventional extrusion of ceramic forming slurry bodies using raw material particulates not enhanced by any technique or treatment.

Some illustrative embodiments are directed towards ceramic granules and processes of forming such, which may be used as proppant particles. Ceramic proppant, a synthetic material may be used in hydraulic fracturing techniques to enhance the production of wellbores formed in subterranean formations, such as those drilled, fractured and used in the production of hydrocarbon fluids. The ceramic proppants may be formed from natural or refined raw materials. The ceramic proppants may be selected based upon their resistance to the impact of extreme physical/chemical factors, such as temperature and pressure, to distribute more readily and/or evenly through a fracture, and to enable faster and/or prolonged extraction of gas and oil from subterranean formations. The resultant ceramic proppants may be coated or uncoated proppants based on organic, inorganic or other metal silica alloys, such as bauxites, kaolins, clays, alumina, alumina silica, magnesium oxide, loams, metallurgical-grade slags, phenol-formaldehyde resins, aluminum, bronze, or any of combinations thereof.

The ceramic proppants may be formed from a slurry of raw materials. The relative quantities of ceramic starting material, water or other solvent, optional binder, and optional dispersant, as well as other ingredients, in the slurry depend on the desired properties for the resultant solid ceramic proppant. The relative quantities and enhancements of starting raw materials may be those amounts and treatments that render the slurry suitable for pumping through the particle forming processing equipment, such as an extruder and die face, perforated membrane, nozzles, and the like, under hypotensive condition, which are lower than conventional processing pressures. As used herein, the term "hypotensive condition" means the pressure that the slurry is subject to in the system at least immediately prior to discharge from a die face in the form of slurry bodies, such pressure being lower than conventional processing pressures using raw material particulates that are unenhanced, and otherwise a pressure incapable of forming slurry bodies from the system.

In embodiments of the disclosure, at least some, or in some aspects, all particulate raw materials used for preparing the ceramic particles may be coated with an agent, which reduces the frictional interaction, and/or abrasiveness of particulates contained within the slurry as the slurry is passed through the processing equipment under hypotensive conditions. Suitable examples of coatings include, but are not limited to, organic, inorganic and synthetic coating agents, such as stearic acid, calcium stearate, furan polymers, phenolic/furan polymers, novolac epoxide polymers, pyrolytic carbon coatings, bisphenolic polymers, phenolic polymers, furfuryl alcohol based polymers, bisphenol-A polymers, fluoropolymers, molybdenum disulfide, other polymers, and the like. Use of any suitable coating which reduces the frictional interaction and/or abrasiveness of particulates in the process of forming the ceramic proppants are within the scope and spirit of the disclosure. In some aspects, the particulate raw materials are minerals coated to reduce frictional interaction and/or abrasiveness of particulates as the raw materials are processed by extrusion under hypotensive conditions.

Coated raw materials may be provided in precoated form, coating in situ during the proppant preparation process, or any suitable combination thereof. The relative quantities of ceramic starting material, water or other solvent, optional binder, and optional dispersant, as well as other ingredients, in the slurry depend on the desired properties for the resultant solid ceramic proppant. The relative quantities starting materials may be those amounts that render the slurry suitable for pumping through the particle forming processing equipment. By nonlimiting example, the slurry may have a solids content of from about 50% by weight to about 90% by weight, from about 60% by weight to about 88% by weight, from about 70% by weight to about 85% by weight, from about 50 to about 60% by weight, or even from about 60% to about 70% by weight. The slurry may further contain additives to maintain the slurry at a constant and stable pH-value, such as in a range of about 7 to about 10 with a variation of about +/−2, about +/−1, about +/−0.5, or even a variation of about +/−0.2.

Some ceramic proppant particles prepared from or by embodiments of the disclosure may any can have any suitable particle size distribution, with single or multiple modal particle size distributions. For example, the proppant can have a particle size distribution, $d_{fs}$, from about 0.5 to about 5.0, wherein, $d_{fs}=\{(d_{f90}-d_{f10})/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size. The proppant may have a particle size distribution, $d_{fs}$, of from about 0.5 to about 1.5, from 0.5 to 5, from 0.5 to 4.5, from 0.5 to 4, from 0.5 to 3.5, from 0.5 to 3, from 0.5 to 2.5, from 0.5 to 2, from 0.5 to 1.5, from 0.5 to 1, from 0.75 to 5, from 0.75 to 2.5, from 0.75 to 2, and any various combinations of ranges provided herein.

The median particle size, $d_{f50}$, of the proppant can be from about 0.01 µm to 50 µm from about 0.2 µm to about 5 µm, from 0.01 µm to 50 µm, from 0.01 µm to 40 µm, from 0.01 µm to 30 µm, from 0.01 µm to 20 µm, from 0.01 µm to 10 µm, from 0.01 µm to 5 µm, from 0.05 µm to 50 µm, from 0.1 µm to 50 µm, from 1 µm to 50 µm, from 0.1 µm to 25 µm, from 0.1 µm to 10 µm, any points between these ranges, or any various combinations of ranges herein. The $d_{f50}$ value is a median particle size where 50% of the particles of the distribution have a smaller particle size. In some aspects, the proppant has a particle size in a range of $d_{f50}$ from 0.7 to 7.0 µm and a $d_{f98}$ from 3.5 to 35 µm with a content of sub-micron particles of less than 1 µm of from about 8 to about 80%.

In some illustrative embodiments, a slurry is prepared which contains water and ceramic starting raw materials, in which a portion of or all are coated. The slurry is prepared by blending, mixing, agitating or similar means known to those of ordinary skill in the art. The ceramic starting material may be an uncalcined ceramic material, partially calcined ceramic material, calcined ceramic material, or combinations thereof. In some embodiments, the ceramic starting materials are raw materials from which a solid ceramic particle that is substantially spherical, round, needle shaped, flat or any combination thereof, can be made, and which may contain naturally-occurring volatiles (which volatiles may include moisture, organics and chemically bound water [also referred to as "water of hydration"]). In some aspects, the amount of naturally-occurring volatiles is from about 10 to about 40 weight percent of the ceramic starting material. The ceramic starting raw materials may include uncalcined clay, partially calcined clay, calcined clay, or mixtures thereof. In still other embodiments, the ceramic starting material is a kaolin clay, bauxitic clay, bauxite, magnesium oxide, any of which may be calcined, partially calcined, or uncalcined, and mixtures thereof. In some cases, some of the ceramic starting raw materials contain bauxite having an alumina content less than about 85 percent by weight, and a size and strength appropriate for use as a proppant, where an appropriate strength of the proppant particles may be defined as a decrease of less than seventy percent of long-term water permeability (as measured in accordance with ISO 13503-5 at 121° C., for a pack of test particles in the size range of 20-40 mesh, where a stress applied to the pack of test particles increases from about 13.8 MPa to about 96.5 MPa).

The slurry may further include a reactant chemical, such as polyvinyl alcohol, polyvinyl acetate, methylcellulose, dextrin, sodium alginate and molasses. Reactant chemicals are typically organic materials used to increase particle strength and shape integrity. In some embodiments, water can act as a reactant. One useful reactant chemical is sodium alginate, which is a naturally occurring polysaccharide that is soluble in water as the sodium salt, and may be cross-linked to form a gel as the calcium salt. Alginate is typically added to the slurry at levels of from about 0.1% to about 2% (weight percent alginate solid relative total slurry weight). After slurry body formation, a coagulation liquid which gels the reactant chemical may be applied to the slurry body. Some examples of useful coagulation liquids for sodium alginate include, but are not limited to, a calcium chloride solution at suitable concentration of calcium chloride, or an aluminum chloride hexahydrate solution. A variety of other reactants in the slurry forming the slurry bodies may be used. This may include other polysaccharides and other cross-linking compounds such as polyvinyl alcohol or borate fluids.

In some aspects of the disclosure, the slurry may further include a suitable dispersant, such as, but not limited to, at least one of a colloid, polyelectrolyte, tetra sodium pyrophosphate, tetra potassium pyrophosphate, polyphosphate, ammonium citrate, ferric ammonium citrate, hexametaphosphate, sodium silicate, ammonium polyacrylate, sodium polymethacrylate, sodium citrate, sodium polysulfonate or hexametaphosphate salt. Dispersants may be included to enhance the total solids content of the slurry by reducing, or optimizing, the slurry viscosity and other rheology characteristics. The amount of dispersant to be used in a slurry may be balanced between the ability to form the slurry into suitable sized slurry bodies, and the ability to make solid, spherical particles. Optimization of the dispersant type and concentration can reduce viscosity. Dispersants may be selected based on cost, availability and effectiveness in optimizing viscosity of the slurry. In those illustrative embodiments where the slurry comprises a dispersant, the amount of dispersant can be any suitable amount, such as for example, less than about 0.3 percent by weight of the dry ceramic starting material, less than about 0.5 percent by weight of the dry ceramic starting material, or even less than about 2 percent, by weight of the dry ceramic starting raw materials.

In some embodiments, the rheological properties of the slurry used to form the ceramic proppant may be further tailored with suitable additives to achieve optimum rheological characteristics, such as thixotropy, pseudoplasticity, and stress/strain viscosity relationship. Some useful examples of the additives include those which influence the zeta potential of substrate particles. In some other embodiments, the slurry contains at least an attapulgite additive influencing the thixotropic behavior of the fluid.

In one nonlimiting example of a suitable ceramic slurry, the slurry contains at least 46% by weight alumina ($Al_2O_3$) provided in coated particles, at least 18% by weight silica ($SiO_2$) provided in coated particles, and a maximum of 10% by weight of zirconia ($ZrO_2$), or its derivatized oxides, provided in coated particles, but not necessarily excluding any other mineral. Substrates from the recycling industry, including, but not limited to glass, fly ash, soda ash, and the like, may also be incorporated in coated or uncoated form. In some cases, the slurry formulation may contain a portion of graphite coated iron particles. The graphite may prevent the iron particles from melting and dissolving in the formulation, thus increasing the probability of maintaining detectable iron particles in the proppant. This may enable the proppant to be detected by a magnetic field. The slurry formulation may contain a portion of graphite coated magnetic powder. The graphite having the same function than under that immediately above. The magnetic powder may include one or multiple materials with different magnetic field strength, enabling the proppant manufacturer of giving a specific code to each proppant.

Some illustrative embodiments of the disclosure relate to methods for preparing ceramic proppant particles. In such embodiments, a slurry suspending or solvating ceramic forming raw materials is provided to an extrusion apparatus including a die face to form droplets, needles, noodles, or other slurry bodies, which then ultimately form ceramic particles useful as proppant particles. The die face may be a slurry body forming structure that receives slurry from feed tank or other suitable source which may contain ceramic forming raw materials suspended or dissolved in water. Pressure can be applied to the feed tank by a pressure supply system, or a pump integrated with the supply system, which causes the slurry to flow through the die face at a selected rate, suitable but low pressure, and optionally in laminar flow. Adjacent the surface of the die face may be a slurry body collection device, and an optional chamber may be disposed there between. The chamber may be used to at least partially cure the slurry bodies, and the collection device may receive the slurry bodies.

In some aspects the die face is part of a drop tower apparatus, where the die face is a perforated membrane having one or more perforations therein that receives slurry from feed tank or other suitable source which contains ceramic forming raw materials. Below the bottom surface of the perforated membrane may be a collection hopper, and an optional chamber may be disposed there between, which may be used to at least partially cure the slurry bodies, and the hopper may receive the at least partially cured slurry bodies. In some other aspects of the disclosure, the die face is part pellet-forming apparatus having at least one nozzle as part of and extending from the die face, in a process commonly called "drip casting", such as those methods disclosed in U.S. patent application Ser. No. 13/357,141, which is incorporated herein in it's entirety. In such embodiments, the nozzle receives slurry from a feed tank, which contains the ceramic raw materials suspended in water. Pressure may be applied to feed tank by pressure supply system to cause slurry to flow through the nozzle at a selected rate—preferably in laminar flow. Adjacent the nozzle is coagulation vessel, which receives the droplets, and a vibrator unit may be connected to the nozzle to supply pressure pulses to the nozzle or directly in the slurry flowing to the nozzle. The resulting vibration of the slurry flow through the nozzle causes the stream exiting the nozzle to break into droplets of uniform size, and as droplets fall toward coagulation vessel, surface tension effects tend to form the droplets into spheres. Spherical particles are formed without the necessity of a sol-gel reaction, reaction gas free fall zone, foamed layer of reaction liquid or reaction liquid directed onto the droplets prior to entering a reaction liquid bath.

Referring now to FIG. 1, which illustrates one embodiment of a system used in some method embodiments for preparing proppant from a ceramic slurry including particulate raw materials which are in whole or only some of which are coated, in accordance with the disclosure. System 100 includes slurry tank 102 containing a slurry 104 at one end of the system, and a processing and/or discharge system 106 for handling proppant material 108 located at an opposing end of system 100 from tank 102. Slurry 104 may include finely ground coated mineral or processed and coated powder (from about 0.01 to about 50 microns in size) capable of producing a strong ceramic material after processing, a suitable amount of optional dispersant helping keep the solid particles in the slurry well separated, water, and a reactant which may optionally react with a component in a mist after slurry body formation to form an at least partially cured slurry body which is semi-solid, crystalline, semi-amorphous, amorphous, liquid, and/or essentially insoluble. In an illustrative example, the weight solids content of the slurry 104, before passage through a die face, may range from about 10% to about 90%, from about 25% to about 85%, or even from about 40% to about 70%, and the viscosity of slurry 104 may be any point in the range from about 1 to about 1,000 mPa·s at operational pressures and temperatures. In some aspects, the process utilized maintains the slurry 104 with a suitably stable temperature, such as in a range of from about 20° C. to about 50° C. with a variation of about +/−2° C.

Slurry 104 may be moved through conduits 110 and 112 by pump 114. While a pump 114 is shown, slurry may also be moved through system 100 by air pressure, or combination of both. A device 116 for regulating, or even controlling, flow rate, suitable but low hypotensive pressure, pressure variation, and the like, may be included in the system for manipulating delivery of slurry to extruder housing 118 through conduit 120. While conduit 120 is depicted as delivering slurry into extruder housing 118 through one conduit 120, in some other aspects the slurry may be delivered into housing 118 through multiple inlets or conduits. Excess slurry 104 not passing through device 116 and into housing 118 may be returned to slurry tank 102 via conduit 123. Slurry 104 delivered to housing 118 from conduit 120 may then pass through perforations in extrusion die face 124 under hypotensive condition and be emitted as slurry bodies 125 contained within chamber 126. Use of at least some of the raw materials as coated particulates enable the slurry to pass through system 100 with decreased pressure requirements, and for extrusion under hypotensive condition through extruder housing 118 and extrusion die face 124 to provide slurry bodies 125. Slurry bodies 125 then travel through chamber 126 in the direction indicated. As slurry bodies 125 travel through and reach a distal portion of chamber 126, they are collected in a hopper section 130. Prior to collection in hopper 130, slurry bodies 125 may be at least partially cured while resident in chamber 126 by any suitable technique, including, but not limited to, self curing, dehydration, desolvation, contact with a curing agent, and the like, or any combination thereof. Chamber 126 may be of any suitable size or shape, including cubical, conical, cylindrical, and the like, and may further contain a system for delivering a mist or gas containing a coagulant agent.

After collection in hopper 130, slurry bodies 125 may be further treated and/or conditioned to form proppant particles in the hopper 130, the bath, storage, processing and/or discharge system 106, or combination thereof. Such treatment or conditioning techniques may include drying, sintering, and the like, techniques disclosed in U.S. Pat. Pub. No. 2012/0231981A1 and U.S. Pat. No. 8,728,991B2 (both of which are included herein in their entirety by reference), or any combination thereof. For example, slurry bodies 125 may be transferred to a sintering chamber 132 from hopper 130 and subject to sufficient temperature conditions to form proppant 108. System 100 may further include a communication and control means 134 linked between device 116 and extruding housing 118 and/or extrusion die face 124 for continuously or semi-continuously regulating, or controlling such properties as flow rate, pressure, pressure variation, and the like. In some aspects of the disclosure, the discharge system 106 includes a conveyor belt at least partially submerged in a bath, which conveys particles received from hopper 130 from the bath and into an air blown drying and/or sintering environment. Particles and/or slurry bodies entering the bath may submerge therein and settle deeper into, or even to the bottom of, the bath. In yet other aspects, the surface of the bath may have a layer of foam formed thereupon to further help maintain the integrity of the slurry body and/or particle shape during the collection process. As described in system 100, or any aspect of the disclosure, the point at which a slurry body transforms into a particle is not necessarily limiting in anyway, and can occur in a mist chamber, in a collection hopper, a bath, sintering process, air drying process, or other suitable device. Also, as used in the disclosure, the terms "particle" and "slurry body" may be interchangeable in some cases, while in other aspects, refer to separate concepts where a "slurry body" is formed up discharge from a perforated membrane, and "particle" is the end product generated by the system.

Figure 2:
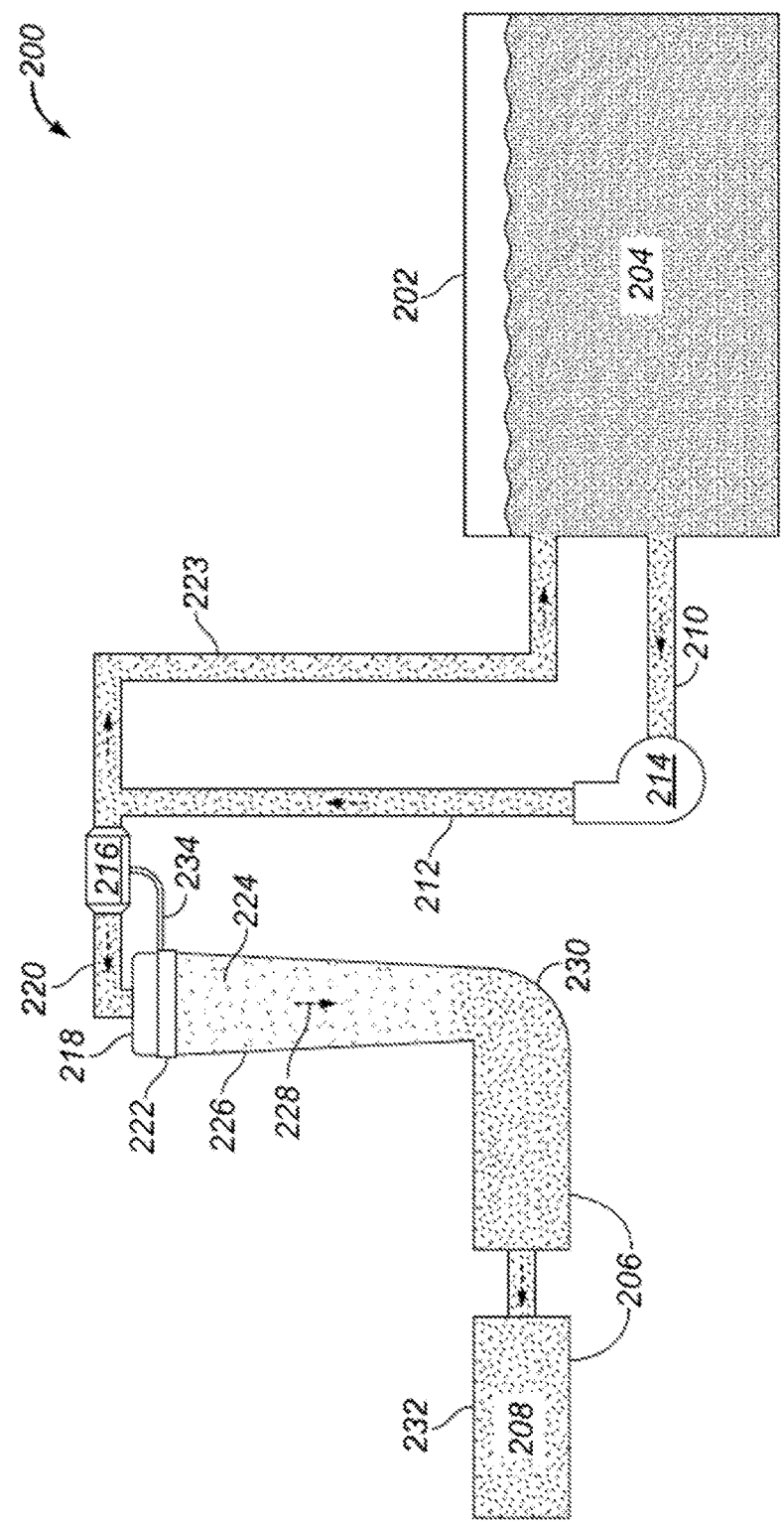

Referring now to FIG. 2, which illustrates another system useful in some method embodiments for preparing proppant from a ceramic slurry including particulate raw materials, which are in whole, or only some of which are coated. System 200 includes slurry tank 202 containing a slurry 204 at one end of the system, and proppant storage, processing and/or discharge system 206 for handling proppant 208, located at an opposing end of system 200, similar to that described above for system 100. Slurry 204 may include finely ground coated mineral or processed and coated powder to produce strong ceramic proppant after processing, a suitable amount of optional dispersant, water, and a optional reactant which may react with a component in a mist after slurry body formation to form an at least partially cured slurry body which is semi-solid, crystalline, semi-amorphous, amorphous, liquid, and/or essentially insoluble. In some aspects, the process utilized maintains the slurry 204 with a suitably stable temperature, such as in a range of from about 20° C. to about 50° C. with a variation of about +/−2° C.

Slurry 204 is moved through conduits 210 and 212 by pump 214. Slurry may also be moved through system 200 by air pressure, or combination of air pressure and pump. A device 216 for regulating, or even controlling, flow rate, pressure, pressure variation, and the like, may be included in the system for manipulating delivery of slurry to a housing 218 through conduit 220. While conduit 220 is depicted as delivering slurry into housing 218 through one conduit 220, in some other aspects the slurry may be delivered into housing 218 through multiple inlets or conduits. Excess slurry 204 not passing through device 216 and into housing 218 may be returned to slurry tank 202 via conduit 223. Slurry 204 delivered to housing 218 from conduit 220 may then pass through perforations in perforated membrane 222 and be emitted as slurry bodies 224 contained within chamber 226. Use of at least some of the raw materials as coated particulates enable the slurry to pass through system 200 with decreased pressure requirements, and for extrusion through housing 218 under hypotensive condition and perforated membrane 222 to provide slurry bodies 224. Slurry bodies 224 then travel through chamber 226 in direction 228. As slurry bodies 224 travel through and reach a distal portion of chamber 226, they are collected in a hopper section 230. Prior to collection in hopper 230, slurry bodies 224 may be at least partially cured while resident in chamber 226 by any suitable technique, including, but not limited to, self curing, dehydration, desolvating, contact with a curing agent, and the like, or any combination thereof. Chamber 226 may be of any suitable size or shape, including conical, cylindrical, and the like, and may further contain a system for delivering a mist or gas containing a coagulant agent. After collection in hopper 230, slurry bodies 224 may be further treated and/or conditioned to form proppant particles in the hopper 226, the bath, storage, processing and/or discharge system 206, or combination thereof. Also, slurry bodies 224 may be transferred to a sintering chamber 232 from hopper 230 and subject to sufficient temperature conditions to form proppant 208.

System 200 may further include a communication and control means 234 linked between device 216 and housing 218 and/or perforated membrane 222 for continuously or semi-continuously regulating, or controlling such properties as flow rate, pressure, pressure variation, and the like. In some aspects of the disclosure, the discharge system 206 includes a conveyor belt at least partially submerged in a bath, which conveys particles received from hopper 230 from the bath and into an air blown drying environment. Particles and/or slurry bodies entering the bath may submerge therein and settle deeper into, or even to the bottom of, the bath. In yet other aspects, the surface of the bath may have a layer of foam formed thereupon to further help maintain the integrity of the slurry body and/or particle shape during the collection process. As described in system 200, or any aspect of the disclosure, the point at which a slurry body transforms into a particle is not necessarily limiting in anyway, and can occur in a mist chamber, in a collection hopper, a bath, sintering process, air drying process, or other suitable device.

In some aspects, the ceramic raw materials are of suitable shape for processing, such as, but not limited to at least substantially spherical, needle shaped, flat, ribbon like, grooved, ovate, trilobal shape, star shape, flat shape, rectangular shape, cubic, bar shaped, flake, cylindrical shape, filament, thread, and the like, or any combinations thereof. The raw materials may be prepared by milling and classification techniques known to those of skill in the art. In some cases the crystal structure of the raw materials and the milling process may be substantial factors affecting the ceramic particle shape resulting from processes according to some aspects of the disclosure. In some cases, the raw material surface structure may be determinant for the abrasivity and internal friction between the raw material particles and thus for the operation of the extruder. However, surface coatings applied to a portion of or all of the ceramic raw materials may reduce the abrasivity and/or internal friction. Further, in addition to coatings applied to the raw materials, the shape(s) of raw materials may be selected to reduce the abrasivity and/or internal friction.

While the above embodiments are described with ceramic particle forming raw materials, where all or a portion thereof may be coated, raw materials may also be of any suitable size, or combination of sizes to further lower requisite system pressure, as well as to help prevent equipment abrasion, increase process output rate, and/or decrease process power consumption. In some cases where a combination of raw material sizes are utilized, the sizes may be tailored to achieve target solids concentration of the raw material slurry, while providing a reduction or no increase in slurry viscosity and solids settling, in comparison to raw materials with essentially similar raw material particle sizes. For example, the slurry may contain a high fraction of particulate raw materials including a plurality of different particle size distribution modes to achieve a target solid volume fraction in the slurry, where the particulate raw materials includes a plurality of volume-average particle size distribution (PSD) modes. A first PSD mode may have a particulate raw material size having a volume-averaged median size at least three times larger than a volume-average median size of a second PSD mode such that a packed volume fraction (PVF) of the particulate raw material mixture exceeds 0.75 or preferably exceeds 0.8. Use of a combination of raw material particulate sizes to achieve increased solids concentration in the slurry with acceptable viscosity and settling resistance may be consistent with that described in U.S. Pat. No. 8,490,698 B2, and its related continuity patent applications and granted patents, the disclosures of which are included herein in their entirety by reference thereto.

In some other aspects, a raw material particulate mixture has at least three PSD modes, where a first amount of particulates have a first PSD, a second amount of particulates have a second PSD, and a third amount of particulates have a third PSD. The first PSD is from two or three to ten times larger than the second PSD, and the second PSD is larger than the third PSD, such as from 1.5 to ten times larger in one embodiment, from three to ten or fifteen times larger in another embodiment, from about 1.5 to 4 times larger in an alternate embodiment, and from 1.5 to less than three times larger in a further embodiment. In embodiments, the raw material particulate mixture includes three or more PSD modes in a ceramic particle forming slurry having increase solids concentration without undesirable solids settling and viscosity at process conditions sufficiently low to obviate the need for system pressure which would otherwise be required if no raw material particulates are coated and/or only substantially single mode PSD raw material particulates are used in the raw material slurry.

As described above, embodiments according to the disclosure enable a reduction in processing pressure when converting the slurry of ceramic raw materials into slurry bodies, by use of coated particulate raw materials, select shaped particulate raw materials, specific size particulates, particulate raw materials including a plurality of different particle size distribution modes, or any suitable combination thereof. Processing pressure is reduced in comparison to use of unrefined particulate raw materials, i.e. those which are not coated, with select shape, and/or of specific size(s), and such reduced pressure is substantially lower than processes using only unrefined particulate raw materials. Reduction in pressure may be about 5% or more, in some cases, while in other cases, the pressure decrease may be about 10% or more, 20% or more, 25% or more, or even 40% or more. Typical ceramic slurry body forming processes require a system of pressure of about 30 kPa to about 60 kPa. However, in accordance with the disclosure, converting the slurry of ceramic raw materials into slurry bodies under hypotensive conditions with significantly lower processing pressure, which may be less than about 30 kPa, less than about 25 kPa, less than about 15 kPa, less than about 10 kPa, or even about 5 kPa or less, or any point between these values, is possible.

The disclosure also relates to methods to prop open subterranean formation fractures, which includes introducing the proppants into a subterranean formation penetrated by a wellbore, and placing the proppant in the fractures. In fracturing operation use, the proppant particles may be combined with a carrier fluid that is then introduced into a well bore of a subterranean formation. The carrier fluid, referred to in the art as a fracturing fluid, is pumped through a well bore into a subterranean zone to be stimulated at a rate and pressure such that fractures are formed and extended into the subterranean zone. At least a portion of the fracturing fluid carries proppant particles into the formed fractures. The particles are deposited in the fractures and the fracturing fluid leaks off into the subterranean zone and/or is returned to the surface. The proppant functions to prevent the formed fractures from closing whereby conductive channels are formed through which produced fluids can flow to the well bore. The carrier fluid may be any viscosified or non-viscosified carrier fluid, such as those that are well known to those skilled in the art including, but not limited to a gas and/or liquid, energized fluid, foam, like aqueous solutions, such as water, brine solutions, and/or synthetic solutions.

In some other aspects, the proppants are used in a gravel packing where proppant is carried to a subterranean producing zone in which a gravel pack is to be placed by a hydrocarbon or water carrying fluid (or other carrier source, such as a fluid, energized fluid, foam, gas, and the like). That is, the particles are suspended in the carrier fluid, which can be viscosified and the carrier fluid is pumped into the subterranean producing zone in which a gravel pack is to be placed. Once the particles are placed in the zone, the treating fluid leaks off into the subterranean zone and/or is returned to the surface. The gravel pack produced functions as a filter to separate formation solids from produced fluids while permitting the produced fluids to flow into and through the well bore.

The disclosure is not only limited to the fabrication of proppant containing ceramic particles prepared from coated particulate raw materials, but may also be applied to matrix materials and filler materials for cements, cement fiber board systems, drywall fillers, caulks, coatings, polymeric systems and other such applications that require high strength filler materials.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method, comprising:
providing an aqueous slurry of ceramic forming raw materials, wherein at least a portion of the ceramic forming raw materials are coated enhanced particulates;
flowing the slurry through at least one extrusion die face to form slurry bodies;
receiving the slurry bodies in a collecting hopper; and
sintering the slurry bodies to form particles,
wherein the slurry bodies are produced from the die face while the slurry is under a hypotensive condition.

2. The method of claim 1, wherein the coated enhanced particulates are present in a plurality of volume-average particle size distribution modes.

3. The method of claim 1, wherein the coated particulates are substantially spherical, needle shaped, flat, ribbon like, grooved, ovate, trilobal shape, star shaped, flat shaped, rectangular shaped, cubic, bar shaped, flaked, cylindrical shaped, filaments, threads, or any combinations thereof.

4. The method of claim 1, wherein the aqueous slurry comprises bauxite containing less than eighty percent alumina.

5. The method of claim 1, wherein the aqueous slurry comprises a rheology modifying agent.

6. The method of claim 1, wherein the slurry further comprises a reactant and a dispersant.

7. The method of claim 6, wherein the dispersant is a surfactant.

8. The method of claim 7, wherein the surfactant at least partially influences slurry body shape, size, or combination thereof.

9. The method of claim 6, wherein the reactant is a polysaccharide.

10. The method of claim 9, wherein the polysaccharide is an alginate.

11. The method of claim 1, wherein the collecting hopper is a bathless container.

12. The method of claim 1, wherein the particles formed are proppant particles.

13. The method of claim 12, wherein the particles are sintered at a temperature in the range of from about 1400° C. to about 1650° C.

14. The method of claim 1, further comprising a sintering step.

15. The method of claim 1, wherein the aqueous slurry has a solids content of from about 60% by weight to about 88% by weight.

16. The method of claim 1, wherein the aqueous slurry further comprises at least one ingredient influencing the rheological properties of the slurry.

17. The method of claim 16, wherein the ingredient is attapulgite.

18. The method of claim 1, wherein the aqueous slurry comprises about greater than or equal to 46% by weight alumina, about less than or equal to 18% by weight silica and about less than or equal to 10% by weight zirconia or derivatized zirconia oxides.

19. The method of claim 1, wherein the aqueous slurry further comprises at least one of glass, fly ash or soda ash.

20. The method of claim 1, wherein the aqueous slurry further comprises graphite coated iron particles, graphite coated magnetic powder, or combination thereof.

21. The method of claim 1, wherein the slurry further comprises a coagulation agent, the coagulation agent being calcium chloride.

22. The method of claim 1, further comprising receiving the slurry bodies in a bath, wherein the bath comprises a foam disposed thereon.

23. The method of claim 1, wherein the die face is a perforated membrane.

24. The method of claim 1, wherein the die face comprises at least one nozzle extending therefrom.

25. The method of claim 1, wherein the hypotensive condition is less than 30 kPa.

26. A method, comprising:
   providing an aqueous slurry of ceramic forming raw materials, the slurry further comprising a reactant and a dispersant, and wherein at least a portion of the ceramic forming raw materials are coated particulates;
   flowing the slurry through a perforated membrane while energizing the slurry to form slurry bodies;
   passing the slurry bodies through a mist in a chamber, the mist comprising a coagulation agent to react with the reactant in the slurry bodies;
   receiving the slurry bodies in a collecting hopper; and
   sintering the slurry bodies to form ceramic proppant particles;
   wherein the slurry bodies are formed from the perforated membrane while the slurry is under a hypotensive condition that is less than 30 kPa.

27. A method of hydraulic fracturing a subterranean formation penetrated by a wellbore, the formation having a fracturing stress, the method comprising:
   pumping a fracturing fluid into the wellbore at a pressure above the fracturing stress of the formation; and
   adding proppant particles to the fracturing fluid and delivering the proppant particles and the fluid into the wellbore;
   wherein the proppant particles are prepared by providing an aqueous slurry of ceramic forming raw materials comprising coated particulates, flowing the slurry through a die face to form slurry bodies under a hypotensive condition of less than 30 kPa, receiving the slurry bodies in a collecting hopper, and drying the slurry to form the proppant particles.

* * * * *